US011940855B2

(12) United States Patent
Umapathy et al.

(10) Patent No.: US 11,940,855 B2
(45) Date of Patent: Mar. 26, 2024

(54) APPARATUS AND METHOD FOR DYNAMIC REALLOCATION OF PROCESSOR POWER BY THROTTLING PROCESSOR TO ALLOW AN EXTERNAL DEVICE TO OPERATE

(71) Applicant: Intel Corporation, Santa Clara, CA (US)

(72) Inventors: Ashwin Umapathy, Hillsboro, OR (US); Chee Lim Nge, Beaverton, OR (US); Timothy Smith, Rancho Cordova, CA (US); Dmitriy Berchanskiy, Roseville, CA (US); Vinay Raghav, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 17/068,709

(22) Filed: Oct. 12, 2020

(65) Prior Publication Data
US 2021/0109578 A1 Apr. 15, 2021

Related U.S. Application Data

(60) Provisional application No. 62/914,944, filed on Oct. 14, 2019.

(51) Int. Cl.
 *G06F 1/26* (2006.01)
(52) U.S. Cl.
 CPC .................... *G06F 1/26* (2013.01)

(58) Field of Classification Search
 None
 See application file for complete search history.

(56) References Cited

U.S. PATENT DOCUMENTS

| | | | | |
|---|---|---|---|---|
| 5,894,579 A | * | 4/1999 | Fujihara | G06F 1/26 713/324 |
| 5,958,025 A | * | 9/1999 | Sonobe | G06F 13/28 710/28 |
| 10,042,403 B2 | * | 8/2018 | Wendt | G06F 1/26 |
| 2006/0212630 A1 | * | 9/2006 | Hoshina | G06F 13/285 710/109 |
| 2007/0143505 A1 | * | 6/2007 | Terrell, II | G06F 1/266 710/10 |

(Continued)

*Primary Examiner* — Danny Chan
(74) *Attorney, Agent, or Firm* — Schwabe, Williamson & Wyatt, P.C.

(57) ABSTRACT

Three components are used to adjust the CPU peak power based on the USB TYPE-C device states. These components include operating system (OS) Peak Power Manager, USB TYPE-C Connector Manager, and USB TYPE-C Protocol Device Driver. The USB TYPE-C Connector Manager sends a synchronous request to the OS Peak Power Manager when a USB TYPE-C power sink device is attached or detached, and the USB TYPE-C Protocol Device Driver sends a synchronous request to the Peak Power Manager when the power sink transitions device state. The Peak Power Manager takes power budget from the CPU when the USB TYPE-C connector is attached to a power sink and is active (e.g., high power device state), and gives back the power budget to the CPU for performance when the USB TYPE-C connector is either detached or the attached and power sink device is idle (lowest device state).

17 Claims, 6 Drawing Sheets

(56) References Cited

U.S. PATENT DOCUMENTS

| | | | | |
|---|---|---|---|---|
| 2008/0148083 A1* | 6/2008 | Pesavento | ............. | G06F 1/3203 |
| | | | | 710/22 |
| 2011/0022356 A1* | 1/2011 | Nussbaum | .......... | G06F 11/3433 |
| | | | | 702/182 |
| 2011/0022826 A1* | 1/2011 | More | ........................ | G06F 1/26 |
| | | | | 713/1 |
| 2013/0346650 A1* | 12/2013 | Uehara | ................ | G06F 13/385 |
| | | | | 710/63 |
| 2015/0346805 A1* | 12/2015 | Miyasaka | ............. | G06F 1/3284 |
| | | | | 710/14 |
| 2016/0011646 A1* | 1/2016 | Maity | ................... | G06F 9/4401 |
| | | | | 713/324 |
| 2018/0314309 A1* | 11/2018 | Lyu | ........................ | G06F 1/266 |
| 2019/0004584 A1* | 1/2019 | Nge | ................... | G06F 13/4282 |
| 2020/0142472 A1* | 5/2020 | Golov | ................... | G06F 3/0649 |
| 2020/0310522 A1* | 10/2020 | Cueva | ..................... | G06F 1/266 |
| 2021/0103330 A1* | 4/2021 | Tan | ....................... | G06F 1/3243 |

\* cited by examiner

APPARATUS AND METHOD FOR DYNAMIC REALLOCATION OF PROCESSOR POWER BY THROTTLING PROCESSOR TO ALLOW AN EXTERNAL DEVICE TO OPERATE

CLAIM OF PRIORITY

This application claims priority of U.S. Provisional Application Ser. No. 62/914,944 titled "APPARATUS AND METHOD FOR DYNAMIC REALLOCATION OF PROCESSOR POWER," filed Oct. 14, 2020, which is incorporated by reference herein.

BACKGROUND

USB Type-C (Universal Serial Bus) device can sink up to 60 Watt (W) power with an ordinary (e.g., not electronically marked) USB Type-C cable through USB-PD (USB power delivery) protocol. USB Type-C devices such as external graphics processor (eGPU) and mass storage take advantage of the high power and high bandwidth (e.g., up to 80 GB/s for future USB4) to deliver higher performance. Many USB Type-C devices today require at least 15 W peak power to deliver full performance. Future generations of USB Type-C devices may require higher peak power when the data bandwidth of USB Type-C connector increases.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
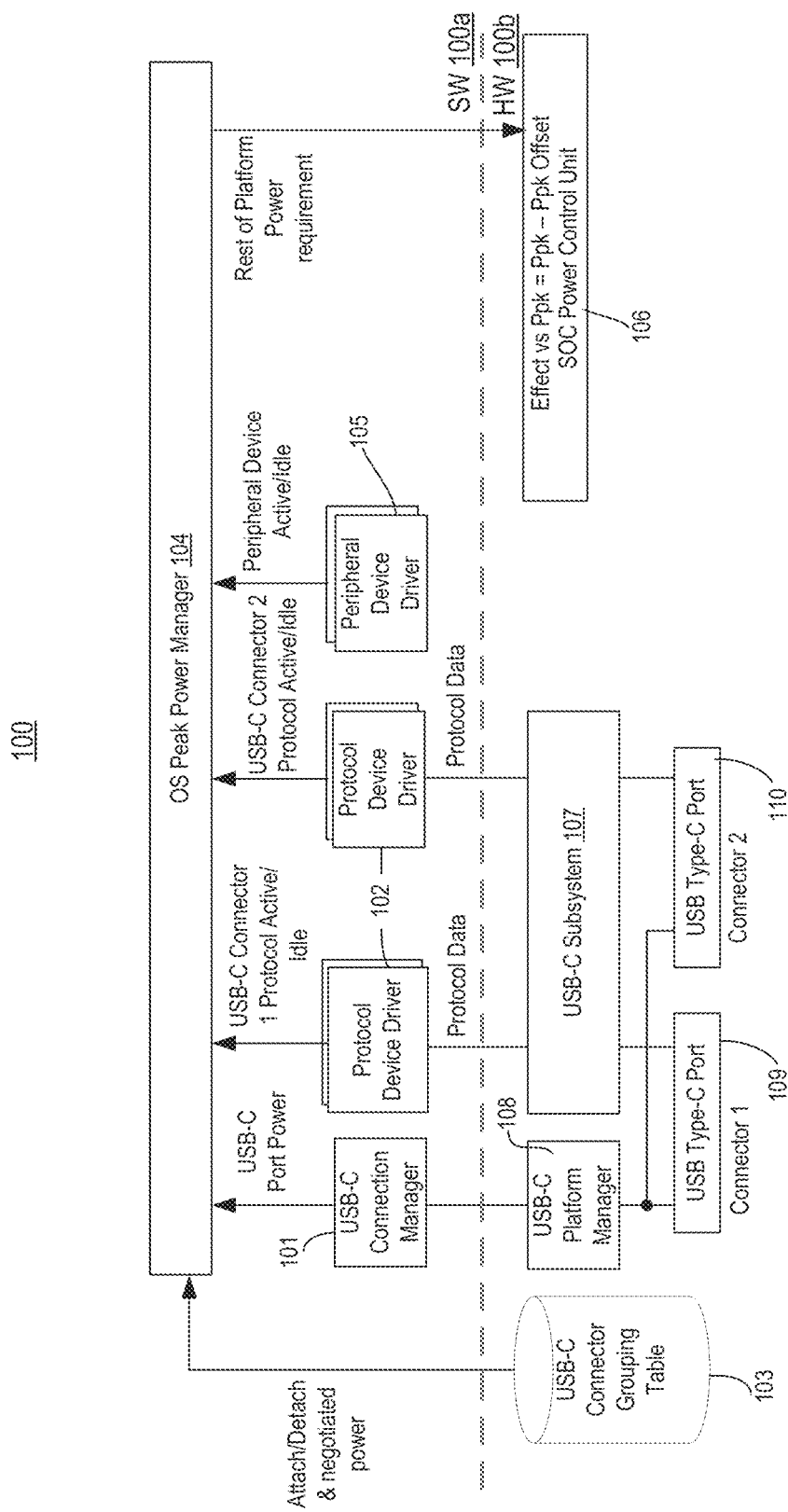
FIG. 1 illustrates an overall system view, in accordance with some embodiments.

Modern mobile computers have limited peak power capability when they are running on battery. This is because a modern mobile computer uses battery configuration with lower voltage (e.g., 2-cell in series) to improve energy efficiency and extend battery life. Additionally, a modern mobile computer uses smaller battery packs to be thinner and lighter. The smaller battery pack increases the impedance of a system voltage and reduces the battery peak power capability.

When the battery peak-power capability is exceeded, there are a few potential risks. These risks include: system unexpectedly shuts down (due to triggering protection circuits); system accelerates battery aging; and safety issue due to battery pack swelling, etc. This poses a challenge for modern mobile computers to deliver peak power performance (e.g., for the CPU and the USB TYPE-C devices) when the system is running on battery. So, modern mobile computers have the following conflicting requirements: higher peak power for USB TYPE-C device performance, taking advantage of higher bandwidth capability of USB4; higher peak power for CPU performance; improving the responsiveness for better user experience every generation; and limited battery peak power capability due to trade-off required for battery life and thin-and-light form-factor to entice customers.

To better quantify the problem, consider a popular, in-the-market premium detachable design, which includes: 2S1P battery configuration (in tablet mode) with 34 W peak power at 30% charge capacity when the battery is fresh and new; rest-of-platform power (e.g., peripheral components such as memory, storage, audio) requires at least 10 W peak power; when one USB TYPE-C device is plugged in, an additional 7.5 W peak power requirement to support 2-lane USB3.2; and that the system-on-chip (SoC) has only 16.5 W peak power budget (34 W-10 W-7.5 W). One typical detachable mobile design requires 71 W peak power (PL4) for full performance. Note, 16.5 W peak power budget (PL4) means greater than 50% responsiveness degradation. Here, the term "PL" refers to a power level which is a package control setting such as PL1, PL2, PL3, PL4. These package power control setting of PL1, PL2, PL3, PL4, and Tau allow a designer to configure a high-performance technology (e.g., Intel Turbo Boost Technology 2.0) to match the platform power delivery and package thermal solution limitations Power Limit 1 (PL1) is a threshold for average power. It is recommended to be equal to the Thermal Design Power (TDP). TDP relates to an ability of a cooler to dissipate heat. TDP is the minimum capacity of the CPU cooler required to get that guaranteed level of performance. PL1 is the effective long-term expected steady state power consumption of a processor. For all intents and purposes, the PL1 is usually defined as the TDP of a processor. So, if the TDP is 80 W, then PL1 is 80 W.

Power Limit 2 (PL2) is a threshold for average power that is exceeded, the PL2 rapid power limiting algorithms will attempt to limit the spike above PL2. PL2 is the short-term maximum power draw for a processor. This number is higher than PL1, and the processor goes into this state when a workload is applied, allowing the processor to use its turbo modes up to the maximum PL2 value. This means that if a processor vendor has defined a processor with a series of turbo modes, they will only work when PL2 is the driving variable for maximum power consumption. Turbo does not work in PL1 mode.

Power Limit 3 (PL3) is a threshold that if exceeded, the PL3 rapid power limiting algorithms will attempt to limit the duty cycle of spikes above PL3 by reactively limiting frequency. This is an optional setting.

Power Limit (PL4) is a limit that will not be exceeded. The PL4 power limiting algorithms will preemptively limit frequency to prevent spikes above PL4.

Turbo time Parameter (Tau) is an average constant used for PL1 exponential weighted moving average (EWMA) power calculation. Tau is a timing variable. It dictates how long a processor should stay in PL2 mode before hitting a PL1 mode. Note that Tau is not dependent on power consumption, nor is it dependent on the temperature of the processor (it is expected that if the processor hits a thermal limit, then a different set of super low voltage/frequency values are used and PL1/PL2 is discarded).

Today, dynamic platform and thermal framework (DPTF) Power Boss can be used to reduce the processor package power (e.g., CPU PL4) when it detects that, the USB TYPE-C port becomes a power sink. If the USB TYPE-C port is detached (e.g., or not sinking power), the DPTF Power Boss or manager can increase the processor package power (e.g., CPU PL4).

One disadvantage of using DPTF Power Boss is, the CPU PL4 cannot be increased when the USB TYPE-C port is in suspend, idle or lowest device state, and the device draws minimal power. DPTF Power Boss cannot adjust CPU power synchronously with the USB TYPE-C device state. This is mainly because it is not feasible to require USB TYPE-C stack making synchronous request to DPTF Power Boss when it changes device state. It is not feasible because DPTF is not an OS (operating system) inbox solution: first DPTF Power Boss may not provide response to device state transition synchronous request, and second DPTF Power Boss may impact device state transition time.

Some embodiments use three components to adjust the CPU peak power based on the USB TYPE-C device states. These components include OS Peak Power Manager, USB TYPE-C Connector Manager, and USB TYPE-C Protocol Device Driver. The USB TYPE-C Connector Manager sends a synchronous request to the OS Peak Power Manager when a USB TYPE-C power sink device is attached or detached, and the USB TYPE-C Protocol Device Driver sends a synchronous request to the Peak Power Manager when the power sink transitions device state. In some embodiments, the Peak Power Manager takes power budget from the CPU when the USB TYPE-C connector is attached to a power sink and is active (e.g., high power device state). In some embodiments, the Peak Power Manager gives back the power budget to the CPU for performance when the USB TYPE-C connector is either detached or the attached and power sink device is idle (lowest device state).

In some embodiments, an apparatus is provided which comprises a processor controlled by an operating system; and an interface communicatively coupled to the processor, wherein the interface is to connect with a device external to the processor, and wherein the operating system determines a power state of the device and throttles power of the processor according to the power state of the device. In some embodiments, the device is a USB Type-C device. In some embodiments, the apparatus a device connection manager (e.g., a software) which identifies when a device is connected to the interface. In some embodiments, the device connection manager sends a synchronous message to the operating system to notify the operating system about the power state of the device. In some embodiments, the power state of the device includes one of a maximum power or an idle power of the device. In some embodiments, the operating system gives power budget to the processor when the device is detached from the interface. In some embodiments, the operating system gives power budget to the processor when the power state of the device is in idle state. In some embodiments, the operating system throttles frequency and/or supply voltage level of the processor to throttle power. In some embodiments, the operating system is to determine a power required by the device, wherein the operating system is to store information about the power required by the device in a register, and wherein the information is used to throttle the power of the processor. In some embodiments, an amount of power throttled is proportional to a difference between a maximum power of the device and an actual power required by the device. In some embodiments, the processor is part of a system-on-chip.

There are many technical effects of various embodiments. For example, the apparatus and method of various embodiments opportunistically maximizes the CPU (or SoC) peak power performance when the attached USB TYPE-C power sink is idle. Considering a USB TYPE-C mass storage device, the USB TYPE-C device is typically idle when the CPU is processing at peak power whereas the CPU does not need peak power when USB TYPE-C device is transferring data to the memory though direct memory access (DMA). Some embodiments describe a method for binding one or more USB TYPE-C protocol device drivers to a connector identifier. This allows reusing the solution for various designs that use different protocol(s) for the USB TYPE-C connector. Other technical effects will be evident from the various figures and embodiments.

Some ways to determine if this scheme is being used is to: (1) run a CPU benchmark without USB TYPE-C power sink attached; (2) run the CPU benchmark with USB TYPE-C power sink attached and force the USB TYPE-C device in an active state (large file transfer); and/or (3) run the CPU benchmark with the USB TYPE-C power sink attached and force the USB TYPE-C device in an idle state (no file transfer). If the CPU benchmark scores are similar between (1) and (3); and higher than (2) then the embodiments may have been used.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e g, immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right." "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core.

Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies.

Here, the term "interconnect" refers to a communication link, or channel, between two or more points or nodes. It may comprise one or more separate conduction paths such as wires, vias, waveguides, passive components, and/or active components. It may also comprise a fabric.

Here the term "interface" generally refers to software and/or hardware used to communicate with an interconnect. An interface may include logic and I/O driver/receiver to send and receive data over the interconnect or one or more wires.

Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to an Autonomous Perimeter (AP). A domain can be an entire system-on-chip (SoC) or part of the SoC, and is governed by a p-unit.

FIG. 1 illustrates system 100, in accordance with some embodiments. System 100 is divided into software (SW) components 100a and hardware (HW) components 100b. System 100 comprises USB Type-C (herein USB-C) Connection Manager 101, Protocol Device Driver 102, Storage 103 having USB-C Connector Grouping Table, Operating System (OS) Peak Power Manager 104, Peripheral Device Driver 105, SoC Power Control Unit (p-unit) 106, USB-C Subsystem 107, USB-C Platform Manager 108, and USB Type-C ports including port 109 for connect 1 and port 110 for connector 2.

Some embodiments use three components to adjust the CPU peak power based on the USB TYPE-C device states: USB TYPE-C Connector Manager 101; USB TYPE-C Protocol Device Driver 102; and OS Peak Power Manager 104.

In some embodiments, USB TYPE-C Connector Manager 101 sends synchronous request to OS Peak Power Manager 104 notifying the active and idle port power when a USB TYPE-C power sink device is attached or detached to one of ports 109 or 110. Additionally, USB TYPE-C Connector Manager 101 provides OS Peak Power Manager 104 the values of USB TYPE-C Port Maximum (Max) Power (power sink device active power) and USB TYPE-C Port Min Power (power sink device idle power).

USB TYPE-C Protocol Device Driver 102 sends synchronous requests to OS Peak Power Manager 104 when the power sink transitions device power state (e.g., between active and idle). OS Peak Power Manager 104 maintains a billboard of active USB TYPE-C Protocol Device Drivers 102. When any of USB TYPE-C Protocol Device Driver 102 is active, OS Peak Power Manager 104 uses USB TYPE-C Port Max Power for the rest-of-platform power requirement calculation and setting Peak Power Offset "Ppk Offset" register of SoC Power Control Unit 106. When all USB TYPE-C Protocol Device Drivers 102 become idle, OS Peak Power Manager 104 uses USB TYPE-C Port Min Power for the rest-of-platform power requirement calculation and setting "Ppk Offset" register of SoC Power Control Unit 106.

OS Peak Power Manager 104 takes power budget from the SoC (system-on-chip) when the USB TYPE-C connector port 109 and 110 is attached to a power sink device and active (operating at high power device state). In some embodiments, OS Peak Power Manager 104 gives back the power budget to the CPU or SoC for performance usage when the USB TYPE-C connector ports 109 or 110 is either detached or the attached power sink is idle (operating at lowest power device state).

Here, CPU is interchangeably used with an SoC (system-on-chip). OS Peak Power Manager 104 writes Peak Power Offset "Ppk Offset" to the SoC (System on Chip) Power Control Unit 106 to request adjusting the SoC effective peak power "Effective Ppk" based on the change in the rest-of-platform power requirement. For example, the Peak Power "Ppk" is set to 50 W based on the battery peak capability. In this example, "Effective Ppk" available to the SoC equals 35 W if the "Ppk Offset" is set to 15 W, and "Effective Ppk" available to the SoC equals 20 W if the "Ppk Offset" is set to 30 W.

OS Peak Power Manager 104 writes higher "Ppk Offset" when the attached power sink is active (e.g., operating at high power device state). Conversely, OS Peak Power Manager 104 writes lower "Ppk Offset" when the power sink is detached from one of ports 109 or 110 or becoming idle (e.g., operating at lower power device state). In some embodiments, OS Peak Power Manager 104 can be used for monitoring other peripheral devices such as audio speaker. The value of "Ppk Offset" can be the sum of USB TYPE-C sink power and other peripheral devices (e.g., audio speaker), for example.

In some embodiments, USB TYPE-C Connector Grouping Table in storage 103 provides OS Peak Power Manager 104 a mapping between USB TYPE-C Protocol Device Driver(s) 102 and the Connector Identifier. USB TYPE-C connector ports 109 and/or 110 allow not only USB3 but also other protocols (such as, PCIe and Display) to be tunneled or multiplexed through the connector ports. The choice of protocol to be supported for each USB TYPE-C connector is system design dependent, for example. It is possible each USB TYPE-C connector supports different protocols in the same system, for example, a first USB TYPE-C supports Display protocol and USB3 tunneling whereas a second USB TYPE-C supports only USB3 protocol.

Figure 2:
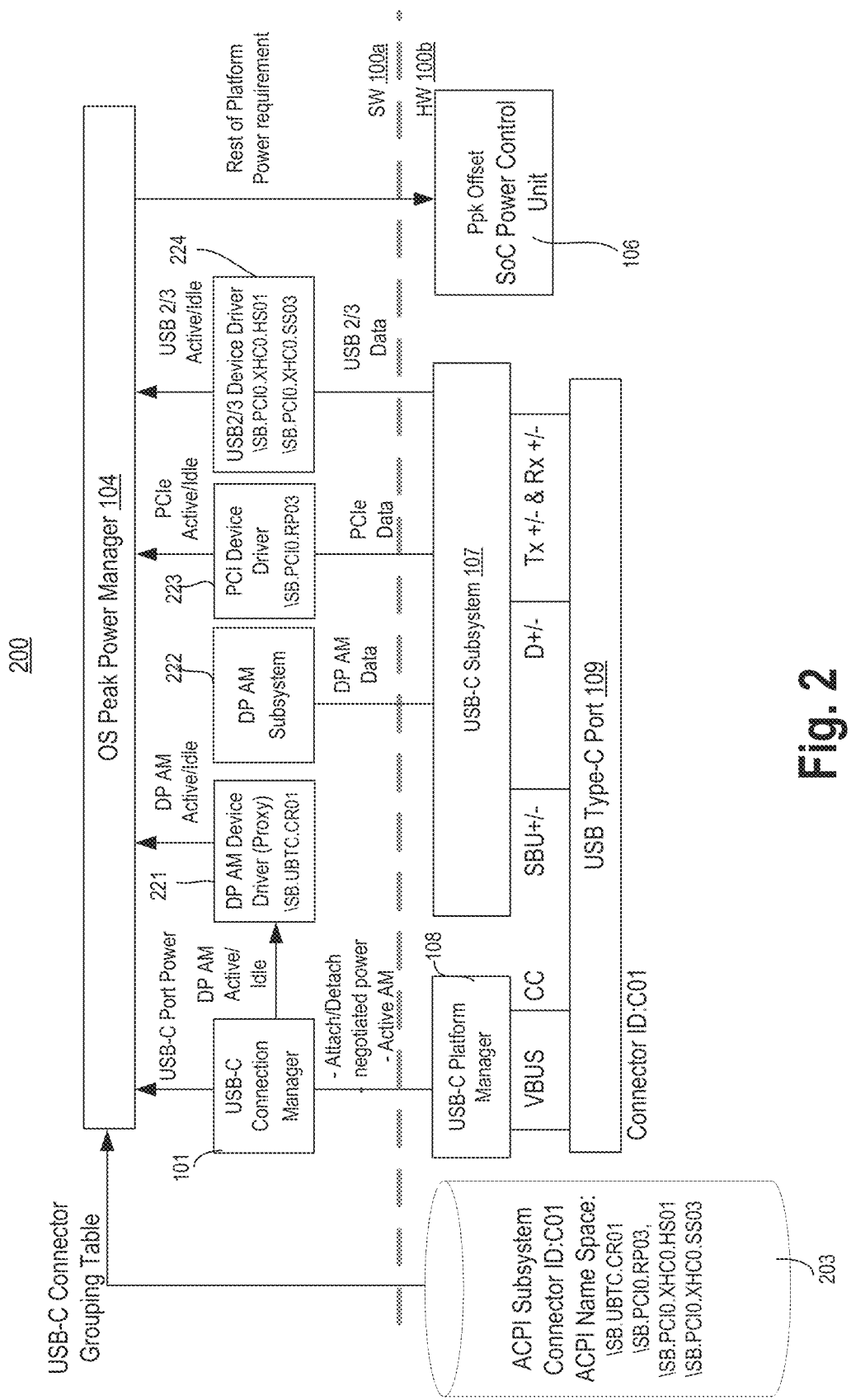
FIG. 2 illustrates a system view, in accordance with some embodiments.

FIG. 2 illustrates system 200, in accordance with some embodiments. System 200 is similar to system 100 including storage 203 (same as 103) includes Advanced Configuration and Power Interface (ACPI) objects, protocol device driver 102 replaced with DisplayPort Alternate Mode (DP AM) driver 221, DP AM subsystem 222, peripheral component interconnect express (PCIe) driver 223, and USB2/3 device driver 224. FIG. 2 shows an example where a USB TYPE-C connector supports DP AM and PCIe protocols in addition to the native USB. In one example, ACPI subsystem is used to map the connector identifier (ID) C01 and the device drivers of the corresponding USB TYPE-C connector in the form of ACPI objects (e.g. \SB.PCI0.RP03, \SB.PCI0.XHC0.SS03) in storage 203. In this example, there is no software (SW) components that manage DisplayPort Alternate Mode data transfer. As a result, a proxy DP AM (DisplayPort Alternate Mode) Device driver 221 is used to report active when USB TYPE-C connector port 109 uses DP AM. In some embodiments, DP AM subsystem 222 incorporates multiple entities on the USB host system that help drive display data to the USB sink device using the DP AM capability. These include the display engine, DP PHY, alternate mode controller, etc.

While the various embodiments are described with reference to USB TYPE-C connector, other types of connectors can be used as well. Likewise, ACPI subsystem can be replaced with any suitable power management subsystem. In some embodiments, ACPI is not used for power management but is used to uniquely identify the protocols behind a specific connector ID (identification). In some embodiments, OS Peak Power Manager 104 is replaced with any suitable power management subsystem. Further, USB in general is not limited to USB 2 or USB 3 protocols, but to any USB protocol and non-USB protocols.

Some embodiments describe a method to calculate power required for the USB TYPE-C power sink and limit SoC power budget on detecting that a USB TYPE-C connector becomes a source port. Some embodiments describe a method to detect when a USB TYPE-C attached device transitions from data path active to idle state and vice versa. Some embodiments describe an approach to calculate what the power requirement would be for the attached USB TYPE-C source port dynamically at run-time and re-adjust the SoC power budget accordingly. Power budget can then be reclaimed for the SoC use when possible, such as when the USB TYPE-C attached device transitions to idle or when the USB TYPE-C port transitions into unattached state or becomes a sink port from a source port.

Figure 3:
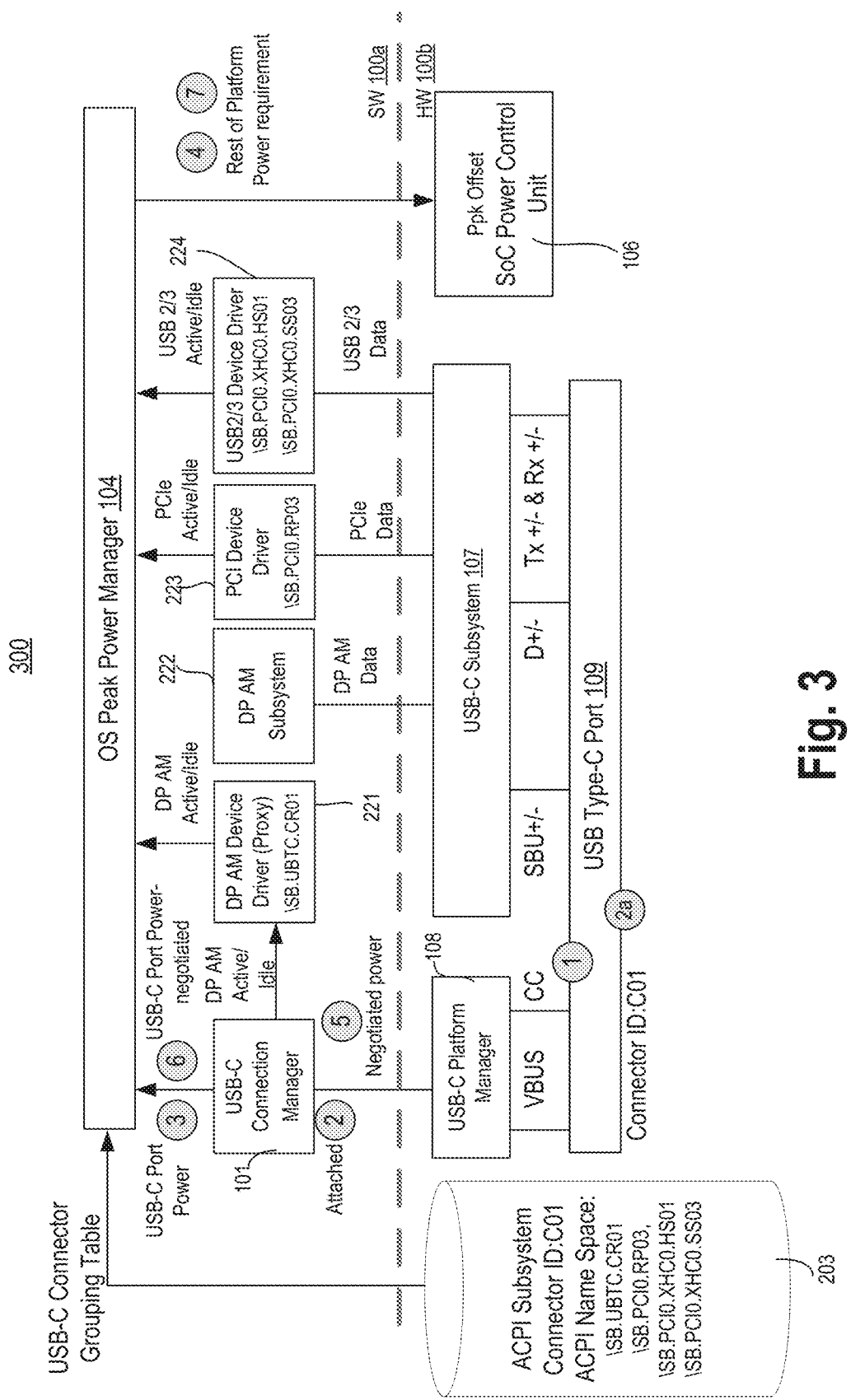
FIG. 3 illustrates a system view with sequence of events to limit central processing unit (CPU) power budget on detecting attach, in accordance with some embodiments.

FIG. 3 illustrates system 300 with sequence of events to limit CPU power budget on detecting attach of a device on one or ports 109 or 110, in accordance with some embodiments. Here, a method is described to detect a USB TYPE-C attached device's transition from data path active to idle state and vice versa to re-adjust SoC power dynamically. Here the method to calculate power required for the USB TYPE-C attached device and limit SoC power is described. In this case, the sequence is numbered by integers in a shaded circle. The sequence may comprise:

First, USB TYPE-C Platform Manager 108 becomes aware that a USB TYPE-C port is becoming an attached source port (i.e. a power sink device has been attached) on one or ports 109 or 110.

Second, USB TYPE-C Platform Manager 108 provides the attach notification to USB TYPE-C Connection Manager 101 of the attached power sink device.

Third, USB TYPE-C Connection Manager 108 informs the OS Peak Power Manager of the maximum power budget required for the USB TYPE-C port based on maximum negotiable power level associated with the attached source port. The maximum negotiable power limit information is made available to USB TYPE-C Connection Manager 101 a priori.

Fourth, OS Peak Power Manager 104 in turn writes the "Ppk Offset" register in SoC p-unit 106 to limit CPU power budget.

Fifth, USB TYPE-C Platform Manager 108 negotiates power autonomously within the maximum negotiable power level and on completion of power negotiation, it informs USB TYPE-C Connection Manager 101 of the actual power required.

Sixth, USB TYPE-C Connection Manager 108 informs OS Peak Power Manager 104 of the actual power required.

Seventh, OS Peak Power Manager 104 writes this to the "Ppk Offset" register to more accurately limit CPU power.

Optionally, if operations 1-4 herein with reference to FIG. 3 do not complete within a certain fixed time interval (e.g., typically within 100 ms) then USB TYPE-C Platform Manager 108 can assert a HW (hardware) throttling signal to the SoC, as soon as it senses the termination on the CC lines, to immediately transition the CPU to a lowest power state, which is a safe state, before supplying VBUS. Note, both CC lines (or pins) and VBUS line or pin are defined by the USB TYPE-C specification.

The HW throttling signal immediately reduces the CPU peak power to the lowest level, which is achieved through the CPU operating at the lowest clock frequency and the lowest operating voltage. Once USB TYPE-C Platform Manager 108 is informed that OS Peak Power manager 104 has limited the CPU power by writing to the "Ppk Offset" register (e.g., in SoC p-unit 106), and power budget for the USB TYPE-C port is available, it can then safely de-assert the HW throttling signal.

Since USB TYPE-C specification allows for other protocol in addition to native USB protocol, there may be no single entity in the OS software (SW) stack that has a view of when a USB TYPE-C port's data path is active. Some embodiments describe three possible realizations of detecting when a data path is active for three kinds of data traffic: USB 2.0/3.x data; PCIe protocol tunneling; and DisplayPort Alternate Mode. The scheme of some embodiments can be extended to other SW components in the OS when other types of protocol for USB TYPE-C is used. The active or idle state information is used to dynamically calculate power requirement for the attached USB TYPE-C source port at run-time as described in detail later on in this invention.

Figure 4:
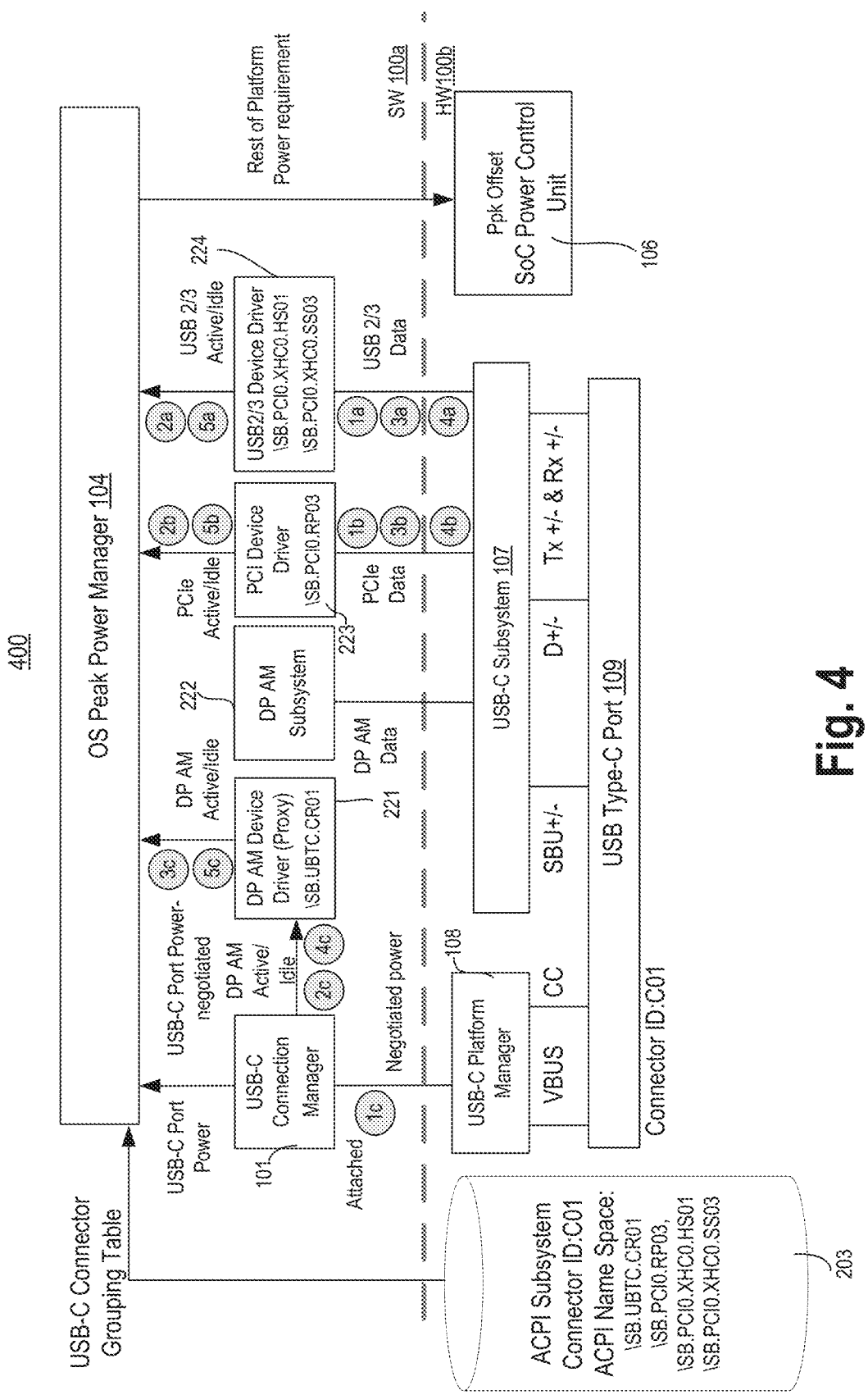
FIG. 4 illustrate a system view with sequence of events for detecting when data path is active or idle, in accordance with some embodiments.

FIG. 4 illustrates system 400 with sequence of events for detecting when data path is active or idle, in accordance with some embodiments. When a USB TYPE-C attached device is operating in USB HighSpeed or USB SuperSpeed modes, the sequence of events (1a, 2a, 3a, 4a, and 5a) when device transitions between active and idle would be the following:

First at "1a", the USB xHCI controller as part of the USB TYPE-C Subsystem 107 detects a new device connection by means of a port attach (on port 109) and informs the USB2/3 Device Driver (OS xHCI Driver) stack 224 to enumerate the device. xHCI is an extensible host controller interface. USB xHCI controller 107 is a USB controller on the system.

Second at "2a", the USB2/3 Device Driver stack 224 does device enumeration followed by a call OS Peak Power Manager 104 to inform about the impending USB port transition to active.

Third at "3a", once OS Peak Power Manager 104 acknowledges the request, USB2/3 Device Driver 224 will then transition the corresponding port and USB device into active or powered state.

Fourth at "4a", on device idle, USB2/3 Device Driver stack 224 will transition the corresponding USB port to suspend.

Fifth at "5a", USB2/3 Device Driver stack 224 then informs OS Peak Power Manager 104 that the USB port has entered an idle state and will wait for an Ack. (acknowledgement). On resume from idle, operations 2a and 3a are repeated.

Referring to FIG. 4, when a USB TYPE-C attached device uses PCIe protocol, the sequence of events (1b, 2b, 3b, 4b, and 5b) are:

First at "1b", USB TYPE-C Subsystem 107 detects a device connection and informs PCI Device Driver 223 stack about the new device connection through standard PCI mechanisms such as hot-plug interrupts.

Second at "2b", OS PCI Device Driver stack 223 does a device enumeration followed by a call to OS Peak Power Manager 104 to request a PCI Root Port transition to D0 from D3. In some embodiments, this will be a blocking call meaning the Root Port cannot transition to D0 until OS Peak Power Manager 104 gives the go ahead. D0 and D1 are device states defined in the PCI specification. These device states represent the power state for the device in the PCI hierarchy. Here, D0 device state is the active state, while D1, D2, and D3 device states are various states of idleness.

Third at "3b", once OS Peak Power Manager 104 acknowledges the request, OS PCI Device Driver 223 will then transition the Root Port to D0.

Fourth at "4b", on device idle, PCI Device Driver 223 will transition the corresponding Root Port to D3 from D0.

Fifth at "5b", PCI Device Driver 223 then inform OS Peak Power Manager 104 that the Root Port has entered an idle state and will wait for an ack (acknowledgement). On resume from idle, steps 2b and 3b are repeated.

In some embodiments, granularity is improved by tracing the link states and their latency tolerance to determine priority. For example, for USB devices, the U states can be tracked to see what idle state the link is in. The lower the idle state of the link, the bigger the latency tolerance. This information is used to determine the priority of the pending interrupt/notification from the respective driver stack to the OS Peak Power Manager when the device resumes from idle.

In this example, when a USB TYPE-C attached device is operating in DisplayPort Alternate Mode, there are no SW (software) components that manage DisplayPort Alternate Mode data transfer. There is a direct connection between DisplayPort Alternate Mode Subsystem and USB TYPE-C Subsystem. The embodiments describe how a virtual DisplayPort Alternate Mode Device Driver is used as a proxy for detecting that Display Port Alternate Mode is active.

Referring to FIG. 4, the sequence of events would be the following the sequence 1c, 2c, 3c, 4c, and 5c is described as:

First at "1c", USB TYPE-C Platform Manager 108 informs USB TYPE-C Connection Manager 101 of DisplayPort Alternate Mode being selected as the current operating mode.

Second at "2c", USB TYPE-C Connection Manager 101 calls the virtual DP AM Device Driver 221 notifying the DisplayMode Alternate Mode is active.

Third at "3c", the virtual DP AM Device Driver 221 informs OS Peak Power Manager 104 of DisplayPort Alternate Mode being active.

Fourth at "4c", when the device behind the USB TYPE-C port 109 gets detached, USB TYPE-C Connection Manager 101 notifies the virtual DP AM Device Driver 221 of the removal.

Fifth at "5c", DP AM Device Driver 221 then informs OS Peak Power Manager 104 of DisplayPort Alternate Mode component switching into idle state from active.

Figure 5:
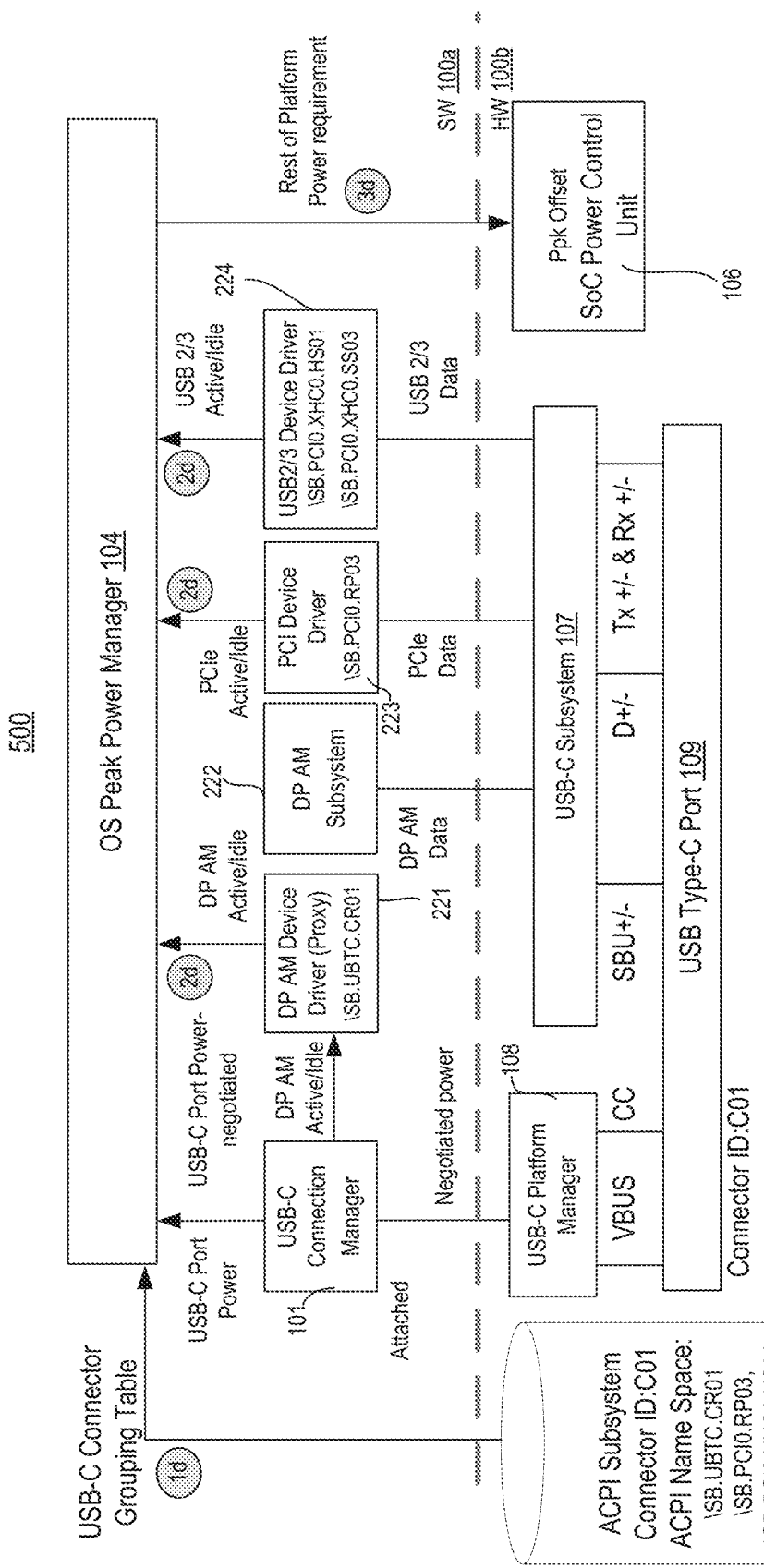
FIG. 5 illustrates a system view with sequence of events for calculating power budget dynamically at run-time, in accordance with some embodiments.

FIG. 5 illustrates system 500 with sequence of events for calculating power budget dynamically at run-time, in accordance with some embodiments. Here, the method to calculate power requirement for the attached USB TYPE-C source port dynamically at run-time and re-adjust the SoC power budget is described. Referring to FIG. 5, the sequence of events (1d, 2d, 3d, 4d, 5d) would be the following:

First at "1d", the platform BIOS (built-in operating system) through the ACPI Subsystem, will provide a connector grouping table from storage 203 to OS Peak Power Manager 104. In this step: (a) The connector grouping table creates a collection out of discrete ACPI namespace objects such as a USB2/3 port, PCIe root-port or a DisplayPort Alternate Mode logical port; (b) The connection grouping table maps each collection to a physical USB Type-C connector; and/or (c) The table will also include the maximum and minimum power that can be consumed by any of the devices in the collection. In some embodiments, step (c) is optional since USB TYPE-C Connection Manager 101 is expected to know the max (maximum) and min (minimum) power requirement of the USB TYPE-C port 109 and will provide this information to OS Peak Power manager 104 on attach.

In some embodiments, OS Peak Power Manager 104 can evaluate other ACPI methods such as _UPC or _PLD associated with each object in the collection to get additional information such as USB port capabilities, physical location of the device, connector type etc. A sample table is illustrated in Table 1

TABLE 1

| Connector ID | Collection objects | Max power | Min power |
|---|---|---|---|
| C01 | \_SB.UBTC.CR01 | 15 W | 2.5 W |
| | \_SB.PCI0.RP.03 | | |
| | \_SB.PCI0.XHC0.HS01 | | |
| | \_SB.PCI0.XHC0.SS03 | | |

Second at "2d", each of the individual driver stacks 221, 223, and 224 inform OS Peak Power Manager 104 about their respective devices transition to active or idle states.

Third at "3d", OS Peak Power Manager 104 maintains a billboard of active devices and when all devices in the collection become idle, OS peak power manager 104 writes the min power value to the "Ppk Offset" register of SoC Power Control Unit 106 to reclaim power for CPU to use. In some embodiments, as soon as any of the devices in the collection resumes to an active state from idle, the CPU power would be limited by the max USB TYPE-C port power budget as informed by USB TYPE-C Connection Manager 101 or the connector grouping table.

The various operations performed by software 100a are provided as machine-readable instruction that are executable on the processor (CPU or SoC). In some embodiments, when these instructions are executed, the processor performs a method comprising identifying that a device is connected to an interface communicatively coupled to the one or more processors. The method further comprises determining an actual power required by the device to operate; and throttling power of the one or more processors to allow the device to operate according to the actual power required by the device, wherein an amount of power throttled is proportional to a difference between a maximum power of the device and the actual power required by the device. In some embodiments, the method comprises giving power budget to the one or more processor when the device is detached from the interface; or giving power budget to the one or more processor when the power state of the device is in idle state.

Figure 6:
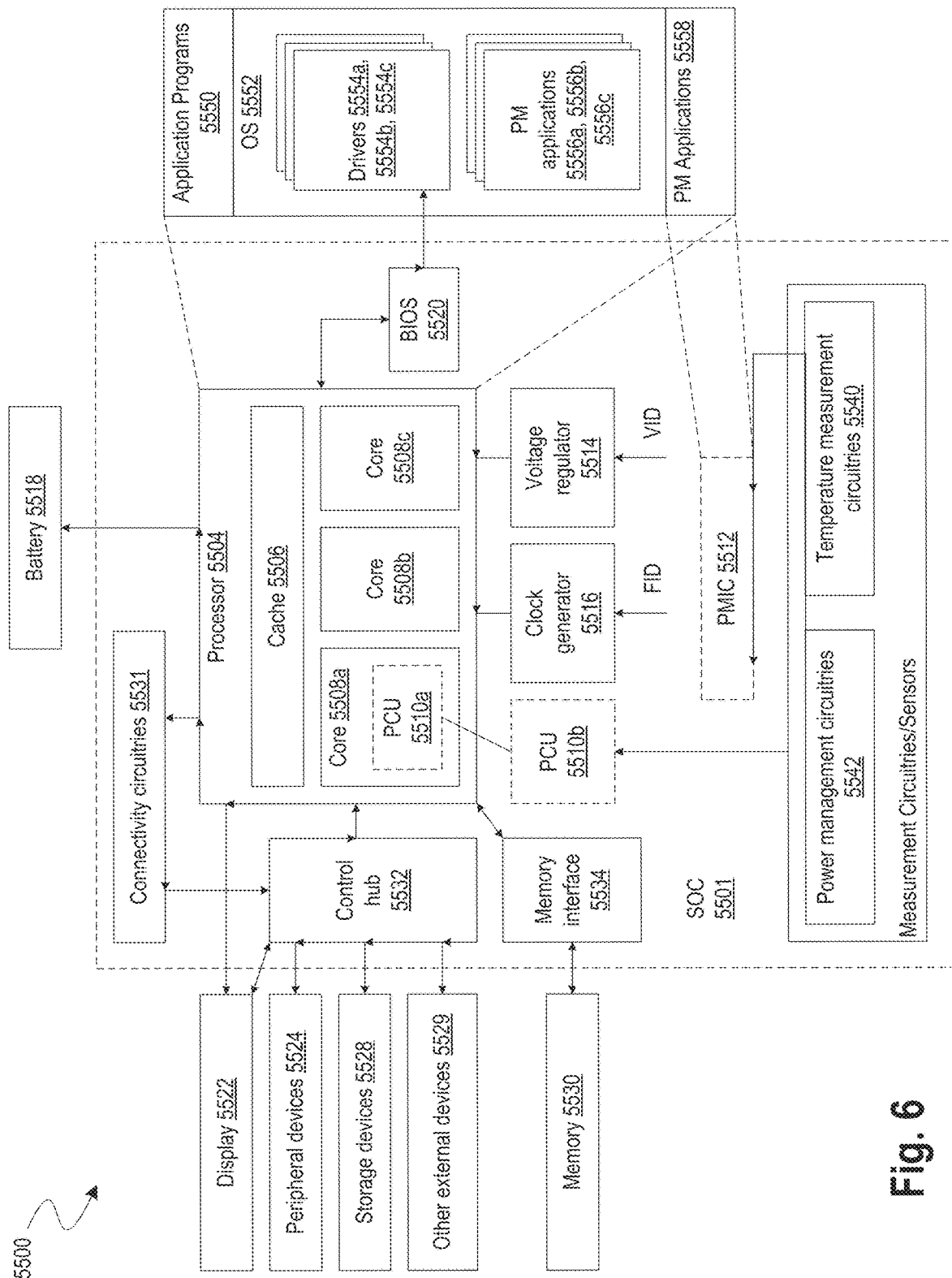
FIG. 6 illustrates a smart device or a computer system or a SoC (System-on-Chip) with apparatus for dynamic reallocation of SoC power, in accordance with some embodiments.

FIG. 6 illustrates a smart device or a computer system or a SoC (System-on-Chip) with apparatus for dynamic real-location of SoC power in accordance with a power state of a coupled connected to the SoC, in accordance with some embodiments. It is pointed out that those elements of FIG. 6 having the same reference numbers (or names) as the elements of any other figure may operate or function in any manner similar to that described, but are not limited to such. Any block in this smart device can have the apparatus for dynamically optimizing battery charging voltage. In some embodiments, the scheme for dynamically optimizing battery charging voltage is stored as machine readable and executable instructions in a battery or any memory of the smart device.

In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 6, with some example components being illustrated to be included within SoC 5501—however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing means. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508*a*, 5508*b*, 5508*c*. Although merely three cores 5508*a*, 5508*b*, 5508*c* are illustrated in FIG. 6, processor 5504 may include any other appropriate number of processing cores, e.g., tens, or even hundreds of processing cores. Processor cores 5508*a*, 5508*b*, 5508*c* may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508*a*, a second section of cache 5506 dedicated to core 5508*b*, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.).

The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device 5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508a, 5508b, 5508c, voltage regulator 5514, memory 5530, a mother-board of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510*a/b* and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510*a*. In an example, some other sections of PCU 5510 may be implemented outside the processing cores 5508, and these sections of PCU 5510 are symbolically illustrated using a dotted box and labelled as PCU 5510*b*. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee 105. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., C0 state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556a, 5556b, 5556c. The OS 5552 may also include various drivers 5554a, 5554b, 5554c, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, pCode executing on PCU 5510a/b has a capability to enable extra compute and telemetries resources for the runtime support of the pCode. Here pCode refers to a firmware executed by PCU 5510a/b to manage performance of the 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SCO 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc,th) based on the available battery power (which changes slowly) and set the SoC throttling peak power (Psoc,th). In some embodiments, pCode decides the frequencies and voltages based on Psoc,th. In this case, throttling events have less negative effect on the SoC performance Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Some embodiments use three components to adjust the peak power of SoC 5501 based on the states of a USB TYPE-C device 5529. These components include OS Peak Power Manager (part of OS 5552), USB TYPE-C Connector Manager (part of OS 5552), and USB TYPE-C Protocol Device Driver (e.g., one of drivers 5554a, 5554b, 5554c). In some embodiments, the USB TYPE-C Connector Manager sends a synchronous request to the OS Peak Power Manager when a USB TYPE-C power sink device is attached or detached from SoC 5501, and the USB TYPE-C Protocol Device Driver sends a synchronous request to the Peak Power Manager when the power sink transitions device state. In some embodiments, the Peak Power Manager takes power budget from the CPU when the USB TYPE-C connector is attached to a power sink and is active (e.g., high power device state). In some embodiments, the Peak Power Manager gives back the power budget to the CPU for performance when the USB TYPE-C connector is either detached or the attached and power sink device is idle (lowest device state).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: An apparatus comprising: a processor controlled by an operating system; and an interface communicatively coupled to the processor, wherein the interface is to connect with a device external to the processor, and wherein the operating system determines a power state of the device and throttles power of the processor according to the power state of the device.

Example 2: The apparatus of claim 1, wherein the device is a USB Type-C device.

Example 3: The apparatus of claim 1 comprises a device connection manager which identifies when a device is connected to the interface.

Example 4: The apparatus of claim 3, wherein the device connection manager sends a synchronous message to the operating system to notify the operating system about the power state of the device.

Example 5: The apparatus of claim 4, wherein the power state of the device includes one of a maximum power or an idle power of the device.

Example 6: The apparatus of claim 1, wherein the operating system gives power budget to the processor when the device is detached from the interface.

Example 7: The apparatus of claim 1, wherein the operating system gives power budget to the processor when the power state of the device is in idle state.

Example 8: The apparatus of claim 1, wherein the operating system throttles frequency and/or supply voltage level of the processor to throttle power.

Example 9: The apparatus of claim 1, wherein the operating system is to determine a power required by the device, wherein the operating system is to store information about the power required by the device in a register, and wherein the information is used to throttle the power of the processor.

Example 10: The apparatus of claim 1, wherein an amount of power throttled is proportional to a difference between a maximum power of the device and an actual power required by the device.

Example 11: The apparatus of claim 1, wherein the processor is part of a system-on-chip.

Example 12: A system-on-chip comprising: a memory; a processor coupled to the memory, wherein the processor is controlled by a power manager; and an interface communicatively coupled to the processor, wherein the interface is to connect with a device external to the processor, and wherein the power manager determines a power state of the device and throttles power of the processor according to the power state of the device.

Example 13: The system of claim 12, wherein the device is a USB Type-C device.

Example 14: The system of claim 12, wherein the power state of the device includes one of a maximum power or an idle power of the device.

Example 15: The system of claim 12, wherein the power manager gives power budget to the processor when the device is detached from the interface.

Example 16: The system of claim 12, wherein the power manager gives power budget to the processor when the power state of the device is in idle state.

Example 17: The system of claim 12, wherein the power manager is to determine a power required by the device, wherein the power manager is to store information about the power required by the device in a register, and wherein the information is used to throttle the power of the processor.

Example 18: The system of claim 12, wherein an amount of power throttled is proportional to a difference between a maximum power of the device and an actual power required by the device.

Example 19: A machine-readable storage medium having machine readable instructions stored thereon, that when executed, cause one or more processors to perform a method comprising: identifying that a device is connected to an interface communicatively coupled to the one or more processors; determining an actual power required by the device to operate; and throttling power of the one or more processors to allow the device to operate according to the actual power required by the device, wherein an amount of power throttled is proportional to a difference between a maximum power of the device and the actual power required by the device.

Example 20: The machine-readable storage medium of claim 19 having machine readable instructions stored thereon, that when executed, cause the one or more processors to perform the method comprising: giving power budget to the one or more processor when the device is detached from the interface; or giving power budget to the one or more processor when the power state of the device is in idle state.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus, comprising:
a processor controlled by an operating system; and
an interface communicatively coupled to the processor, wherein the interface is to connect with a device external to the processor, and wherein the operating system is to:
  in response to the device being connected to the interface, set a peak power of the processor based on a maximum power budget of the interface;
  if a fixed time interval passes after the device is connected to the interface and before the setting of the peak power of the processor based on the maximum power budget of the interface, assert a throttling signal to throttle power of the processor to a lowest power state, and once a platform manager is informed that the operating system has throttled power of the processor and power budget to a port is available, de-assert the throttling signal; and
  after the setting of the peak power of the processor based on the maximum power budget of the interface, determine a power required by the device, and change the peak power of the processor according to the power required by the device.

2. The apparatus of claim 1, wherein the operating system is to determine the power required by the device in a power negotiation.

3. The apparatus of claim 1, wherein the operating system is in communication with a device connection manager which is to identify when the device is connected to the interface.

4. The apparatus of claim 1, wherein to determine the power required by the device, the operating system is to obtain a stored maximum power value for the device when the device is in an active state.

5. The apparatus of claim 1, wherein to determine the power required by the device, the operating system is to obtain a stored minimum power value for the device when the device is in an idle state.

6. The apparatus of claim 1, wherein the operating system is to give power budget to the processor when a power state of the device transitions from an active state to an idle state.

7. The apparatus of claim 1, wherein to limit a power of the processor to the peak power, the operating system is to throttle a frequency and/or a supply voltage level of the processor.

8. The apparatus of claim 7, wherein an amount of the throttling to limit the power of the processor to the peak power is proportional to a difference between a maximum power of the device and the power required by the device.

9. The apparatus of claim 1, wherein:
to set the peak power of the processor based on the maximum power budget of the interface, the operating system is to write a peak power offset value to a register; and
to set the peak power of the processor according to the power required by the device, the operating system is to update the peak power offset value in the register.

10. A system, comprising:
a power control unit of a processor;
a port to connect with a device external to the processor;
a peak power manager coupled to the power control unit;
a connection manager coupled to the peak power manager; and
a platform manager coupled to the connection manager and the port, wherein:
  if within a fixed time interval, a sequence is completed in which the platform manager is to determine that the device is connected to the port and provide an attach notification to the device, and the peak power manager is to receive information from the connection manager regarding a maximum power budget required by the device and request that the power control unit set a peak power of the processor based on the maximum power budget required by the device, then:
    the platform manager is to negotiate a power required by the device and inform the connection manager of an actual power required by the device; and
    the peak power manager is to receive additional information from the connection manager of the actual power required by the device and request that the power control unit change the peak power of the processor based on the actual power required by the device; and
  if the sequence is not completed within the fixed time interval, the platform manager is to assert a throttling signal to throttle power of the processor to a lowest power state before supplying a bus voltage to the port.

11. The system of claim 10, wherein the device is a USB Type-C device.

12. The system of claim 10, wherein the power required by the device includes one or more of a maximum power or an idle power.

13. The system of claim 10, wherein the peak power manager is to give power budget to the processor when the power required by the device transitions to an idle power.

14. The system of claim 10, wherein when the device is connected to the port, the peak power manager is to determine the maximum power budget of the port and to store information about the maximum power budget of the port in a register, and when the peak power manager subsequently determines the power required by the device, the peak power manager is to update the information in the register to identify the power required by the device.

15. The system of claim 10, wherein when the peak power is changed based on the actual power required by the device, the platform manager is to de-assert the throttling of the processor to the lowest power state and to set the peak power of the processor according to the power required by the device.

16. The system of claim 10, wherein the throttling signal comprises a hardware throttling signal.

17. The system of claim 14, wherein the information in the register comprises an offset, and the peak power manager is to determine the peak power of the processor based on subtracting the offset from a maximum peak power of the processor.

* * * * *